(12) United States Patent
Kou et al.

(10) Patent No.: US 12,160,345 B2
(45) Date of Patent: Dec. 3, 2024

(54) GENERATING SETTING INFORMATION OF PHYSICAL PORTS BASED ON COMMUNICATION SPEED

(71) Applicant: NIPPON TELEGRAPH AND TELEPHONE CORPORATION, Tokyo (JP)

(72) Inventors: Sei Kou, Musashino (JP); Tomoya Hatano, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 384 days.

(21) Appl. No.: 17/623,938

(22) PCT Filed: Jul. 1, 2019

(86) PCT No.: PCT/JP2019/026024
§ 371 (c)(1),
(2) Date: Dec. 30, 2021

(87) PCT Pub. No.: WO2021/001867
PCT Pub. Date: Jan. 7, 2021

(65) Prior Publication Data
US 2022/0368595 A1 Nov. 17, 2022

(51) Int. Cl.
*H04L 41/0896* (2022.01)
*H04L 49/00* (2022.01)

(52) U.S. Cl.
CPC ......... *H04L 41/0896* (2013.01); *H04L 49/30* (2013.01)

(58) Field of Classification Search
CPC ............ H04L 41/0896; H04L 41/0897; H04L 41/0668; H04L 41/12; H04L 41/1213;
(Continued)

(56) References Cited

U.S. PATENT DOCUMENTS

2004/0179518 A1* 9/2004 Bruckman .......... H04L 41/0889
370/358
2007/0214248 A1* 9/2007 Ikeda .................. H04L 43/0894
709/223

(Continued)

FOREIGN PATENT DOCUMENTS

JP 5949035 B2 7/2016

*Primary Examiner* — Ian N Moore
*Assistant Examiner* — Brian T Le
(74) *Attorney, Agent, or Firm* — Harness, Dickey & Pierce, P.L.C.

(57) ABSTRACT

A replacement management apparatus includes a detection section which detects a first communication speed and first setting information of a physical port used for connection for each of a communication apparatus to be replaced and a communication apparatus to be connected, and detects a second communication speed of a physical port used for connection for a replacing communication apparatus, and a generation section which generates second setting information of the physical port used for connection for each of the replacing communication apparatus and the communication apparatus to be connected based on the detected first communication speed, the detected second communication speed, and the detected first setting information.

9 Claims, 21 Drawing Sheets

(58) Field of Classification Search
CPC ..... H04L 47/76; H04L 46/30; H04L 43/0876; H04L 12/44; H04L 12/28
See application file for complete search history.

(56) References Cited

U.S. PATENT DOCUMENTS

2010/0247094 A1* 9/2010 Young ................. H04L 43/0888
398/25
2017/0134271 A1* 5/2017 Kohiga ............... H04L 43/0864

* cited by examiner

Fig. 4

| COMMUNICATION APPARATUS | PORT NUMBER OF COMMUNICATION APPARATUS | APPARATUS TO BE CONNECTED | PORT NUMBER OF APPARATUS TO BE CONNECTED |
|---|---|---|---|
| FIRST COMMUNICATION APPARATUS | A-6 | SECOND COMMUNICATION APPARATUS | B-1 |
| | A-7 | SECOND COMMUNICATION APPARATUS | B-2 |
| SECOND COMMUNICATION APPARATUS | B-1 | FIRST COMMUNICATION APPARATUS | A-6 |
| | B-2 | FIRST COMMUNICATION APPARATUS | A-7 |
| | B-6 | THIRD COMMUNICATION APPARATUS | C-1 |
| | B-7 | THIRD COMMUNICATION APPARATUS | C-2 |
| THIRD COMMUNICATION APPARATUS | C-1 | SECOND COMMUNICATION APPARATUS | B-6 |
| | C-2 | SECOND COMMUNICATION APPARATUS | B-7 |

Fig. 5

| COMMUNICATION APPARATUS | PORT NUMBER OF COMMUNICATION APPARATUS | APPARATUS TO BE CONNECTED | PORT NUMBER OF APPARATUS TO BE CONNECTED |
|---|---|---|---|
| FIRST COMMUNICATION APPARATUS | A-9 | FOURTH COMMUNICATION APPARATUS | D-4 |
| | A-10 | FOURTH COMMUNICATION APPARATUS | D-5 |
| THIRD COMMUNICATION APPARATUS | C-3 | SECOND COMMUNICATION APPARATUS | D-7 |
| | C-4 | SECOND COMMUNICATION APPARATUS | D-8 |
| FOURTH COMMUNICATION APPARATUS | D-4 | FIRST COMMUNICATION APPARATUS | A-9 |
| | D-5 | THIRD COMMUNICATION APPARATUS | A-10 |
| | D-7 | THIRD COMMUNICATION APPARATUS | C-3 |
| | D-8 | THIRD COMMUNICATION APPARATUS | C-4 |

Fig. 6

| COMMUNICATION APPARATUS | PORT NUMBER OF COMMUNICATION APPARATUS | COMMUNICATION SPEED | SETTING INFORMATION | | | |
|---|---|---|---|---|---|---|
| | | | PORT SETTING | ADDRESS | ROUTING SETTING | |
| | | | | | GATEWAY (PORT) | |
| FIRST COMMUNICATION APPARATUS | A-6 | 10Gbps | VLAN AND THE LIKE | 10.0.0.2 | A-6 | ⋮ |
| | A-7 | 10Gbps | VLAN AND THE LIKE | 10.0.0.3 | A-7 | ⋮ |
| | | | | ⋮ | ⋮ | |
| SECOND COMMUNICATION APPARATUS | B-1 | 10Gbps | VLAN AND THE LIKE | 10.0.0.2 | B-6 | ⋮ |
| | B-2 | 10Gbps | VLAN AND THE LIKE | 10.0.0.3 | B-7 | |
| | B-6 | 10Gbps | VLAN AND THE LIKE | 15.0.0.2 | B-1 | |
| | B-7 | 10Gbps | VLAN AND THE LIKE | 15.0.0.3 | B-2 | |
| | | | | ⋮ | ⋮ | |
| THIRD COMMUNICATION APPARATUS | C-1 | 10Gbps | VLAN AND THE LIKE | 15.0.0.2 | C-1 | ⋮ |
| | C-2 | 10Gbps | VLAN AND THE LIKE | 15.0.0.3 | C-2 | |
| | | | | ⋮ | ⋮ | |

Fig. 7

| COMMUNICATION APPARATUS | PORT NUMBER OF COMMUNICATION APPARATUS | COMMUNICATION SPEED | SETTING INFORMATION | | |
|---|---|---|---|---|---|
| | | | PORT SETTING | ROUTING SETTING | |
| | | | ADDRESS | GATEWAY (PORT) | ... |
| FIRST COMMUNICATION APPARATUS | A-9 | 10Gbps | 10.0.0.2<br>10.0.0.3<br>... | A-6<br>A-7<br>... | ... |
| | A-10 | 10Gbps | | | |
| THIRD COMMUNICATION APPARATUS | C-3 | 10Gbps | 15.0.0.2<br>15.0.0.3<br>... | C-1<br>C-2<br>... | ... |
| | C-4 | 10Gbps | | | |
| FOURTH COMMUNICATION APPARATUS | D-4 | 10Gbps | | | |
| | D-5 | 10Gbps | | | |
| | D-7 | 10Gbps | | | |
| | D-8 | 10Gbps | | | |

Fig. 8

| PAIR NUMBER | APPARATUS TO BE REPLACED PAIR | REPLACING APPARATUS PAIR |
|---|---|---|
| 1 | B-1 & A-6 | D-4 & A-9 |
| 2 | B-2 & A-7 | D-5 & A-10 |
| 3 | B-6 & C-1 | D-7 & C-3 |
| 4 | B-7 & C-2 | D-8 & C-4 |

Fig. 9

| COMMUNICATION APPARATUS | SETTING INFORMATION | | | | |
|---|---|---|---|---|---|
| | PORT NUMBER OF COMMUNICATION APPARATUS | COMMUNICATION SPEED | PORT SETTING | ADDRESS | ROUTING SETTING |
| | | | | | GATEWAY (PORT) |
| FIRST COMMUNICATION APPARATUS | A-9 | 10Gbps | VLAN AND THE LIKE | ~~10.0.0.2~~ ~~10.0.0.3~~ ... | ~~A-6~~ ~~A-7~~ ... |
| | A-10 | 10Gbps | VLAN AND THE LIKE | 10.0.0.2 10.0.0.3 ... | A-9 A-10 ... |
| THIRD COMMUNICATION APPARATUS | C-3 | 10Gbps | VLAN AND THE LIKE | ~~15.0.0.2~~ ~~15.0.0.3~~ ... | ~~C-1~~ ~~C-2~~ ... |
| | C-4 | 10Gbps | VLAN AND THE LIKE | 15.0.0.2 15.0.0.3 ... | C-3 C-4 ... |
| FOURTH COMMUNICATION APPARATUS | D-4 | 10Gbps | VLAN AND THE LIKE | 10.0.0.2 10.0.0.3 15.0.0.2 15.0.0.3 ... | D-7 D-8 D-4 D-5 ... |
| | D-5 | 10Gbps | VLAN AND THE LIKE | | |
| | D-7 | 10Gbps | VLAN AND THE LIKE | | |
| | D-8 | 10Gbps | VLAN AND THE LIKE | | |

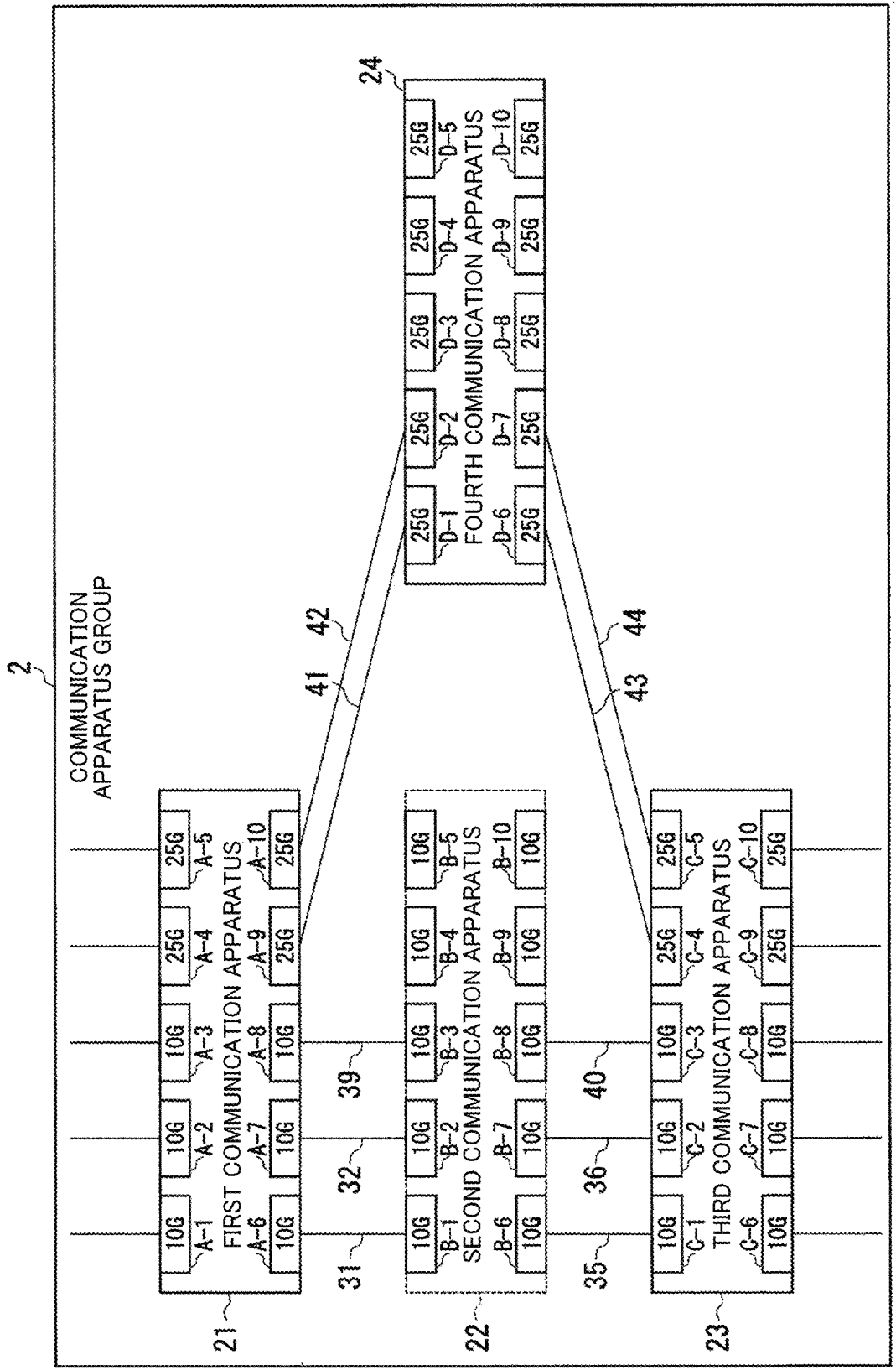

Fig. 17

| COMMUNICATION APPARATUS | PORT NUMBER OF COMMUNICATION APPARATUS | APPARATUS TO BE CONNECTED | PORT NUMBER OF APPARATUS TO BE CONNECTED |
|---|---|---|---|
| FIRST COMMUNICATION APPARATUS | A-6 | SECOND COMMUNICATION APPARATUS | B-1 |
| | A-7 | SECOND COMMUNICATION APPARATUS | B-2 |
| | A-8 | SECOND COMMUNICATION APPARATUS | B-3 |
| SECOND COMMUNICATION APPARATUS | B-1 | FIRST COMMUNICATION APPARATUS | A-6 |
| | B-2 | FIRST COMMUNICATION APPARATUS | A-7 |
| | B-3 | FIRST COMMUNICATION APPARATUS | A-8 |
| | B-6 | THIRD COMMUNICATION APPARATUS | C-1 |
| | B-7 | THIRD COMMUNICATION APPARATUS | C-2 |
| | B-8 | THIRD COMMUNICATION APPARATUS | C-3 |
| THIRD COMMUNICATION APPARATUS | C-1 | SECOND COMMUNICATION APPARATUS | B-6 |
| | C-2 | SECOND COMMUNICATION APPARATUS | B-7 |
| | C-3 | SECOND COMMUNICATION APPARATUS | B-8 |

Fig. 18

| COMMUNICATION APPARATUS | PORT NUMBER OF COMMUNICATION APPARATUS | APPARATUS TO BE CONNECTED | PORT NUMBER OF APPARATUS TO BE CONNECTED |
|---|---|---|---|
| FIRST COMMUNICATION APPARATUS | A-9 | FOURTH COMMUNICATION APPARATUS | D-1 |
| | A-10 | FOURTH COMMUNICATION APPARATUS | D-2 |
| THIRD COMMUNICATION APPARATUS | C-4 | FOURTH COMMUNICATION APPARATUS | D-6 |
| | C-5 | FOURTH COMMUNICATION APPARATUS | D-7 |
| FOURTH COMMUNICATION APPARATUS | D-1 | FIRST COMMUNICATION APPARATUS | A-9 |
| | D-2 | FIRST COMMUNICATION APPARATUS | A-10 |
| | D-6 | THIRD COMMUNICATION APPARATUS | C-4 |
| | D-7 | THIRD COMMUNICATION APPARATUS | C-5 |

Fig. 19

| PAIR NUMBER | APPARATUS TO BE REPLACED PAIR | REPLACING APPARATUS PAIR |
|---|---|---|
| 1 | B-1, B-2, B-3 & A-6, A-7, A-8 | D-1, D-2 & A-9, A-10 |
| 2 | B-6, B-7, B-8 & C-1, C-2, C-3 | D-6, D-7 & C-4, C-5 |

Fig. 20

| COMMUNICATION APPARATUS | PORT NUMBER OF COMMUNICATION APPARATUS | COMMUNICATION SPEED | SETTING INFORMATION (ROUTING SETTING) | |
|---|---|---|---|---|
| | | | ADDRESS | GATEWAY (PORT) |
| FIRST COMMUNICATION APPARATUS | A-6 | 10Gbps | 10.0.0.2 | A-6 |
| | A-7 | 10Gbps | 10.0.0.3 | A-7 |
| | A-8 | 10Gbps | ... | ... |
| SECOND COMMUNICATION APPARATUS | B-1 | 10Gbps | | |
| | B-2 | 10Gbps | 10.0.0.2 | B-3 |
| | B-3 | 10Gbps | 10.0.0.3 | B-1 |
| | B-6 | 10Gbps | 11.0.0.2 | B-2 |
| | B-7 | 10Gbps | 12.0.0.3 | B-2 |
| | B-8 | 10Gbps | 15.0.0.2 | B-3 |
| | | | ... | ... |
| THIRD COMMUNICATION APPARATUS | C-1 | 10Gbps | 15.0.0.2 | C-1 |
| | C-2 | 10Gbps | 15.0.0.3 | C-2 |
| | C-3 | 10Gbps | ... | ... |

Fig. 21

| COMMUNICATION APPARATUS | PORT NUMBER OF COMMUNICATION APPARATUS | COMMUNICATION SPEED | SETTING INFORMATION (ROUTING SETTING) | | |
|---|---|---|---|---|---|
| | | | ADDRESS | GATEWAY (PORT) | ... |
| FIRST COMMUNICATION APPARATUS | A-6 | 10Gbps | | | |
| | A-7 | 10Gbps | 10.0.0.2<br>10.0.0.3 | A-6<br>A-7 | ... |
| | A-9 | 25Gbps | ... | ... | |
| | A-10 | 25Gbps | | | |
| THIRD COMMUNICATION APPARATUS | C-1 | 10Gbps | | | |
| | C-2 | 10Gbps | 15.0.0.2<br>15.0.0.3 | C-1<br>C-2 | ... |
| | C-4 | 25Gbps | ... | ... | |
| | C-5 | 25Gbps | | | |
| FOURTH COMMUNICATION APPARATUS | D-1 | 25Gbps | | | |
| | D-2 | 25Gbps | | | |
| | D-6 | 25Gbps | | | |
| | D-7 | 25Gbps | | | |

Fig. 22

| COMMUNICATION APPARATUS | PORT NUMBER OF COMMUNICATION APPARATUS | COMMUNICATION SPEED | SETTING INFORMATION (ROUTING SETTING) | |
|---|---|---|---|---|
| | | | ADDRESS | GATEWAY (PORT) |
| FIRST COMMUNICATION APPARATUS | ~~A-6~~ | ~~10Gbps~~ | ~~10.0.0.2~~ | ~~A-6~~ |
| | ~~A-7~~ | ~~10Gbps~~ | ~~10.0.0.3~~ | ~~A-7~~ |
| | | | ... | ... |
| | A-9 | 25Gbps | 10.0.0.2 | A-9 |
| | A-10 | 25Gbps | 10.0.0.3 | A-10 |
| | | | ... | ... |
| THIRD COMMUNICATION APPARATUS | ~~C-1~~ | ~~10Gbps~~ | ~~15.0.0.2~~ | ~~C-1~~ |
| | ~~C-2~~ | ~~10Gbps~~ | ~~15.0.0.3~~ | ~~C-2~~ |
| | ~~C-3~~ | ~~10Gbps~~ | ~~15.0.0.4~~ | ~~C-3~~ |
| | | | ... | ... |
| | C-4 | 25Gbps | 15.0.0.2 | C-4 |
| | C-5 | 25Gbps | 15.0.0.3 | C-5 |
| | | | ... | ... |
| FOURTH COMMUNICATION APPARATUS | D-1 | 25Gbps | 10.0.0.3 | D-1 |
| | D-2 | 25Gbps | 10.0.0.3 | D-2 |
| | D-6 | 25Gbps | 10.0.0.3 | D-1 |
| | D-7 | 25Gbps | 10.0.0.3 | D-2 |
| | | | 10.0.0.3 | D-1 |
| | | | ... | ... |

GENERATING SETTING INFORMATION OF PHYSICAL PORTS BASED ON COMMUNICATION SPEED

CROSS-REFERENCE TO RELATED APPLICATIONS

This application is a 371 U.S. National Phase of International Application No. PCT/JP2019/026024 filed on Jul. 1, 2019. The entire disclosure of the above application is incorporated herein by reference.

TECHNICAL FIELD

The present invention relates to a replacement management apparatus, a replacement management method, and a program.

BACKGROUND ART

There are cases where a communication apparatus is replaced for a reason such as migration to the next-generation network, failure of the communication apparatus, or the life of the communication apparatus. At a site of replacement, a communication apparatus to be replaced and a communication apparatus to be connected are connected with a predetermined wiring pattern by using cables connected to ports. When the communication apparatus to be replaced fails, each cable connected to the communication apparatus to be replaced is disconnected from each port of the communication apparatus to be replaced by an operator at the site.

The operator at the site replaces the communication apparatus to be replaced with a replacing communication apparatus which has the sum total of communication speeds of individual ports (hereinafter referred to as "a communication capacity") equal to the communication capacity of the communication apparatus to be replaced. The operator at the site connects the replacing communication apparatus and the communication apparatus to be connected with the wiring pattern identical to the wiring pattern of cables connected to the communication apparatus to be replaced. In addition, a remote manager sets setting information identical to setting information of the communication apparatus to be replaced in the replacing communication apparatus.

Note that the operator at the site may connect the replacing communication apparatus and the communication apparatus to be connected with the wiring pattern identical to the wiring pattern of cables connected to the communication apparatus to be replaced before the communication apparatus to be replaced fails.

PTL 1 discloses an apparatus which generates setting information based on a topology of a ring network corresponding to a wiring pattern of cables, and sets the generated setting information in a communication apparatus (see PTL 1).

CITATION LIST

Patent Literature

[PTL 1] Japanese Patent No. 5949035

SUMMARY OF THE INVENTION

Technical Problem

However, in the case where the communication apparatus to be replaced and the replacing communication apparatus have different communication capacities, the communication apparatus to be connected and the replacing communication apparatus are connected by using cables of which the number is different from the number of cables connected from the communication apparatus to be connected to the communication apparatus to be replaced. In this case, it is not possible for the operator at the site to set the setting information identical to the setting information of the communication apparatus to be replaced in the replacing communication apparatus for a reason such as change of the wiring pattern. To cope with this, the remote manager needs to manually generate setting information of the replacing communication apparatus and setting information of the communication apparatus to be connected in accordance with new wiring, and then set the setting information in the replacing communication apparatus and set the setting information in the communication apparatus to be connected. Thus, conventionally, there are cases where a replacement management apparatus cannot generate the setting information of the replacing communication apparatus and the setting information of the communication apparatus to be connected.

In view of the above circumstances, an object of the present invention is to provide a replacement management apparatus, a replacement management method, and a program capable of generating setting information of a replacing communication apparatus and setting information of a communication apparatus to be connected.

Means for Solving the Problem

An aspect of the present invention is a replacement management apparatus including: a detection section which detects a first communication speed and first setting information of a physical port used for connection for each of a communication apparatus to be replaced and a communication apparatus to be connected, and detects a second communication speed of a physical port used for connection for a replacing communication apparatus; and a generation section which generates second setting information of the physical port used for connection for each of the replacing communication apparatus and the communication apparatus to be connected based on the detected first communication speed, the detected second communication speed, and the detected first setting information.

Effects of the Invention

According to the present invention, it is possible to generate the setting information of the replacing communication apparatus and the setting information of the communication apparatus to be connected.

BRIEF DESCRIPTION OF DRAWINGS

FIG. 4 is a view showing an example of topology information before update (before connection of a replacing apparatus) in the first embodiment.

FIG. 5 is a view showing an example of the topology information after update (after connection of the replacing apparatus) in the first embodiment.

FIG. 6 is a view showing an example of apparatus information before update (before connection of the replacing apparatus) in the first embodiment.

FIG. 7 is a view showing an example of the apparatus information during update (after connection of the replacing apparatus) in the first embodiment.

FIG. 8 is a view showing an example of correspondence information in the first embodiment.

FIG. 9 is a view showing an example of the apparatus information after update (after connection of the replacing apparatus) in the first embodiment.

FIG. 16 is a view showing an example of replacement of a communication apparatus in a third embodiment.

FIG. 17 is a view showing an example of topology information before update (before connection of a replacing apparatus) in the third embodiment.

FIG. 18 is a view showing an example of the topology information after update (after connection of the replacing apparatus) in the third embodiment.

FIG. 19 is a view showing an example of correspondence information in the third embodiment.

FIG. 20 is a view showing an example of apparatus information before update (before connection of the replacing apparatus) in the third embodiment.

FIG. 21 is a view showing an example of the apparatus information during update (after connection of the replacing apparatus) in the third embodiment.

FIG. 22 is a view showing an example of the apparatus information after update (after connection of the replacing apparatus) in the third embodiment.

DESCRIPTION OF EMBODIMENTS

Embodiments of the present invention will be described in detail with reference to the drawings.

First Embodiment

Figure 1:
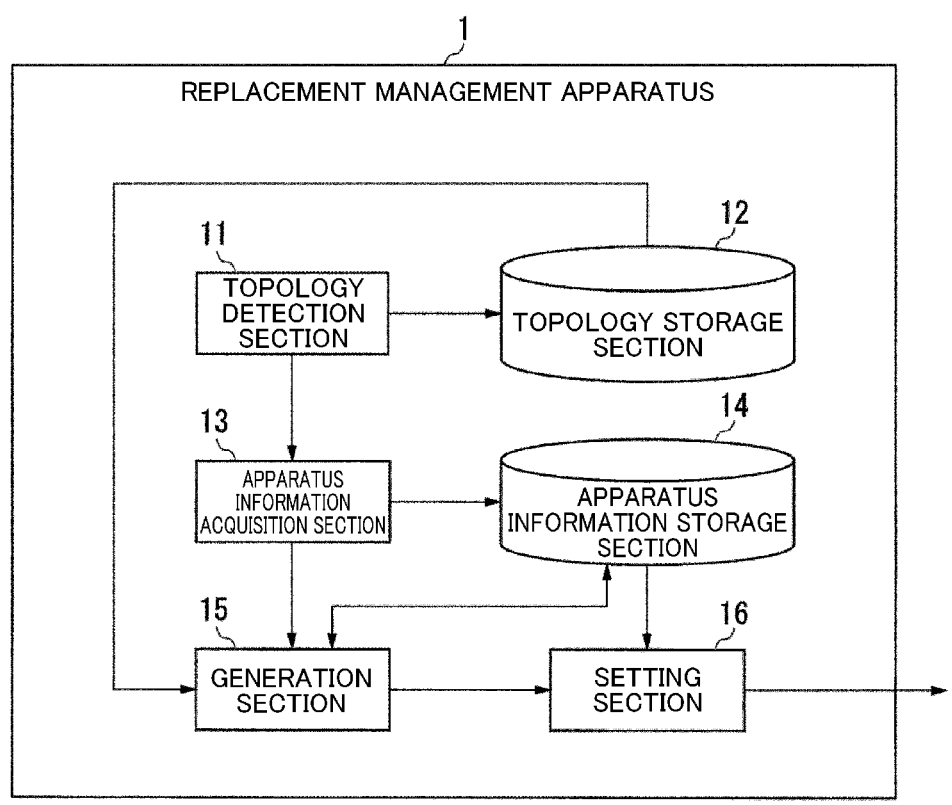
FIG. 1 is a view showing an example of the configuration of a replacement management apparatus in a first embodiment.

FIG. 1 is a view showing an example of the configuration of a replacement management apparatus 1. The replacement management apparatus 1 is an information processing apparatus which manages replacement of a communication apparatus. The replacement management apparatus 1 generates setting information of a replacing communication apparatus and setting information of a communication apparatus to be connected. The replacement management apparatus 1 sets the generated setting information in the replacing communication apparatus and sets the generated setting information in the communication apparatus to be connected. That is, the replacement management apparatus 1 records the generated setting information in a memory of a predetermined communication apparatus.

Examples of a replacement pattern of the communication apparatus include replacement of the communication apparatus after failure of a communication apparatus to be replaced (in a state in which communication cannot be performed), and replacement of the communication apparatus before the failure of the communication apparatus to be replaced (in a state in which communication can be performed).

Note that the replacement management apparatus 1 may determine whether or not the communication apparatuses having satisfied predetermined conditions can be replaced with each other. Examples of the predetermined conditions include a condition concerning the number of cables and a condition concerning a communication capacity.

The replacement management apparatus 1 includes a topology detection section 11, a topology storage section 12, an apparatus information acquisition section 13, an apparatus information storage section 14, a generation section 15, and a setting section 16.

Figure 2:
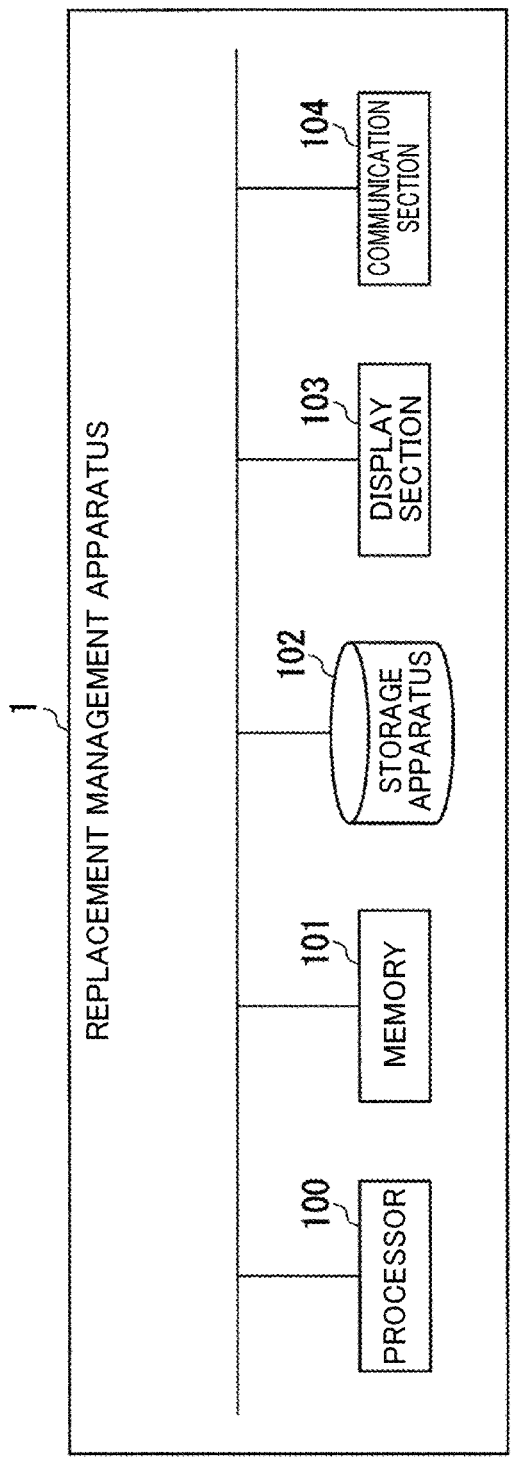
FIG. 2 is a view showing an example of the hardware configuration of the replacement management apparatus in the first embodiment.

FIG. 2 is a view showing an example of the hardware configuration of the replacement management apparatus 1. The replacement management apparatus 1 includes a processor 100, a memory 101, a storage apparatus 102, a display section 103, and a communication section 104.

The processor 100 such as a CPU (Central Processing Unit) executes a program loaded into the memory 101 from the storage apparatus 102 which is a non-volatile recording medium (non-transitory recording medium), and the individual functional sections shown in FIG. 1 (the topology detection section 11, the apparatus information acquisition section 13, the generation section 15, and the setting section 16) are thereby implemented as software.

The topology storage section 12 and the apparatus information storage section 14 shown in FIG. 1 are implemented by using, e.g., the storage apparatus 102. A program may be recorded in a computer-readable recording medium. Examples of the computer-readable recording medium include a portable medium such as a flexible disc, a magneto-optical disc, a ROM (Read Only Memory), or a CD-ROM (Compact Disc Read Only Memory), and a non-transitory recording medium such as the storage apparatus 102 including a hard disk incorporated in a computer system. The program may be transmitted via a telecommunication line.

Part or the whole of the replacement management apparatus 1 may be implemented by using hardware including an electronic circuit or circuitry which uses, e.g., an LSI (Large Scale Integration circuit), an ASIC (Application Specific Integrated Circuit), a PLD (Programmable Logic Device), or an FPGA (Field Programmable Gate Array). The display section 103 is, e.g., a liquid crystal display. The communication section 104 executes, e.g., wireless communication.

Figure 3:
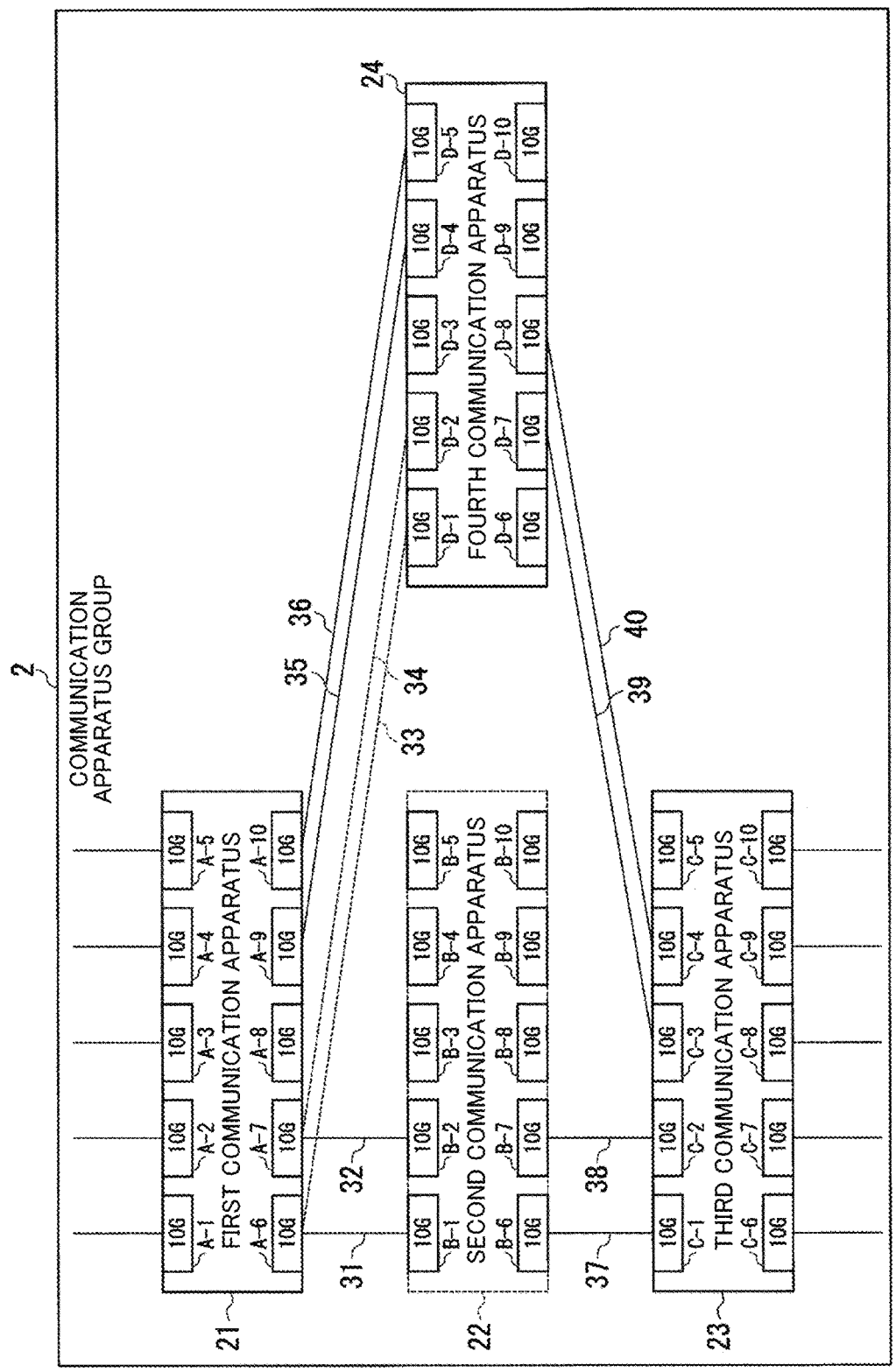
FIG. 3 is a view showing an example of replacement of a communication apparatus in the first embodiment.

FIG. 3 is a view showing an example of replacement of a communication apparatus. A communication apparatus group 2 includes, as an example, a first communication apparatus 21, a second communication apparatus 22, a third communication apparatus 23, and a fourth communication apparatus 24. The communication apparatus group 2 is the communication apparatus group managed by the replacement management apparatus 1. The communication apparatus in the communication apparatus group 2 is a relay apparatus constituting a network, and is, e.g., a switch or a router. The communication apparatus group 2 may be directly connected to the replacement management apparatus 1, or may also be connected to the replacement management apparatus 1 via a communication line.

The second communication apparatus 22 is connected to the first communication apparatus 21 by using a cable 31 and a cable 32. The second communication apparatus 22 is connected to the third communication apparatus 23 by using a cable 37 and a cable 38.

In FIG. 3, the communication capacity of the second communication apparatus 22 is equal to the communication capacity of the fourth communication apparatus 24. The communication speed of each port of the second communication apparatus 22 is, e.g., 10 Gbps. The communication speed of each port of the fourth communication apparatus 24 is, e.g., 10 Gbps.

In FIG. 3, the second communication apparatus 22 serving as an apparatus to be replaced is faulty. The second communication apparatus 22 serving as the apparatus to be replaced is replaced by the fourth communication apparatus 24 serving as a replacing apparatus. In the case where the second communication apparatus 22 serving as the apparatus to be replaced is replaced by the fourth communication apparatus 24 serving as the replacing apparatus, the fourth communication apparatus 24 is connected to the first communication apparatus 21 by an operator. The operator connects any port of the first communication apparatus 21 and any port of the fourth communication apparatus 24. The fourth communication apparatus 24 is connected to the third communication apparatus 23 by the operator. The operator connects any port of the third communication apparatus 23 and any port of the fourth communication apparatus 24.

The operator may connect the individual ports of the first communication apparatus 21 and the individual ports of the fourth communication apparatus 24 ("A-6 and D-1" and "A-7 and D-2") by using the cable 31 and the cable 32 in a manner in which a cable 33 and a cable 34 are used. The operator may also connect the individual ports of the first communication apparatus 21 and the individual ports of the fourth communication apparatus 24 ("A-9 and D-4" and "A-10 and D-5") by using newly provided two cables other than the cable 31 and the cable 32 in a manner in which, e.g., a cable 35 and a cable 36 are used.

Similarly, the operator may connect the third communication apparatus 23 and the fourth communication apparatus 24 by using a cable 37 and a cable 38. The operator may connect any port of the third communication apparatus 23 and any port of the fourth communication apparatus 24 by using newly provided two cables other than the cable 37 and the cable 38 in a manner in which, e.g., a cable 39 and a cable 40 are used.

The replacement management apparatus 1 detects a topology of a network of the communication apparatus group 2 (a wiring pattern of cables between communication apparatuses) for a wiring pattern of cables connected by the operator. The replacement management apparatus 1 detects communication speeds of the individual ports (physical ports) of the second communication apparatus 22 serving as the apparatus to be replaced and the fourth communication apparatus 24 serving as the replacing apparatus for the wiring pattern of cables connected by the operator.

The replacement management apparatus 1 generates setting information of the communication apparatus based on the detected communication speeds or the like. The replacement management apparatus 1 sets the generated setting information in the replacing communication apparatus and sets the generated setting information in the communication apparatus to be connected.

Next, the detail of the replacement management apparatus 1 will be described. The topology detection section 11 detects the topology of the network of the communication apparatus group 2 based on an identifier of each communication apparatus. The topology detection section 11 records topology information representing the topology of the network of the communication apparatus group 2 in the topology storage section 12. For example, the topology detection section 11 records the topology information in the topology storage section 12 at the timing of replacement of the communication apparatus (communication device), at the timing of detection of the topology by the operator, or the like. The topology storage section 12 stores the topology information of the network of the communication apparatus group 2.

The topology information includes the identifier of each communication apparatus. The identifier of each communication apparatus is, e.g., a fixed identification number, an IP (Internet Protocol) address, or an identification number associated with the communication apparatus in the topology information by a manager or the operator. The identifier of each communication apparatus is input to the topology storage section 12 via the topology detection section 11 by the operator.

FIG. 4 is a view showing an example of topology information before update (before connection of the replacing apparatus) "DB-t1". In the topology information, the identifier of the communication apparatus, a port number (physical port number) of the communication apparatus, the identifier of another communication apparatus connected to the communication apparatus (hereinafter referred to as "an apparatus to be connected"), and the port number of the apparatus to be connected are associated with each other. For example, the port number "B-1" of the second communication apparatus 22 serving as the apparatus to be replaced and the port number "A-6" of the first communication apparatus 21 serving as the apparatus to be connected are associated with each other.

FIG. 5 is a view showing an example of topology information after update ("after failure of the apparatus to be replaced" (after connection of the replacing apparatus)) "DB-t2". In the topology information after update, when compared with the topology information before update, data on the second communication apparatus 22 serving as the apparatus to be replaced is deleted. In the topology information after update, when compared with the topology information before update, data on the fourth communication apparatus 24 serving as the replacing apparatus is added. For example, the port number "D-4" of the fourth communication apparatus 24 serving as the replacing apparatus and the port number "A-9" of the first communication apparatus 21 serving as the apparatus to be connected are associated with each other.

The apparatus information acquisition section 13 (detection section) detects information (hereinafter referred to as "apparatus information") on each communication apparatus in the communication apparatus group 2. For example, the apparatus information is a database representing the communication speed of each port (physical port). The apparatus information acquisition section 13 detects the apparatus information of each communication apparatus in the communication apparatus group 2 by using, e.g., Simple Network Management Protocol (SNMP) or the like. The apparatus information acquisition section 13 updates the apparatus information based on the detection result. The apparatus information acquisition section 13 records the apparatus information updated based on the detection result in the apparatus information storage section 14. The apparatus information storage section 14 stores the apparatus information.

FIG. 6 is a view showing an example of apparatus information before update "DB-c1". In the apparatus information, the identifier of the communication apparatus, the port number of the communication apparatus, the communication speed (physical communication speed) of the port, and the setting information of the communication apparatus are associated with each other.

The setting information of the communication apparatus is information including parameter values of communication, and includes, e.g., port setting and routing setting. The port setting is, e.g., information indicating whether or not the network is a virtual LAN (Virtual Local Area Network). The routing setting includes the port number of a gateway and the IP address of a destination. The manager or the operator records, in advance, the setting information in the apparatus information stored in the apparatus information storage section 14 according to specifications of the communication apparatus group 2 (network).

In a communication apparatus (an L2 switch (layer 2 switch) or the like), in the case where the port setting is necessary and the routing setting is not necessary, data may be registered only in the port setting in the setting information. In a communication apparatus (an L3 switch (Layer 3 switch), a router, or the like), in the case where the port setting is not necessary and the routing setting is necessary, data may be registered only in the routing setting in the setting information.

FIG. 7 is a view showing an example of the apparatus information during update (after connection of the replacing apparatus). The apparatus information acquisition section 13 updates the apparatus information based on the detection result. In the apparatus information during update, when compared with the apparatus information before update, data on the second communication apparatus 22 serving as the apparatus to be replaced is deleted.

The link-up of the port of the first communication apparatus 21 connected to the second communication apparatus 22 serving as the apparatus to be replaced is interrupted. The link-up of the port of the third communication apparatus 23 connected to the second communication apparatus 22 serving as the apparatus to be replaced is interrupted. Information other than predetermined information (routing information) of each port of which the link-up is interrupted is deleted from the apparatus information. That is, the predetermined information (routing information) other than "port setting" in the setting information is not deleted from the apparatus information before update until the setting information is taken over.

The generation section 15 acquires the topology information before update (before connection of the replacing apparatus) "DB-t1" from the topology storage section 12. The generation section 15 acquires the topology information after update (after connection of the replacing apparatus) "DB-t2" from the topology storage section 12. The generation section 15 generates information (hereinafter referred to as "correspondence information") representing a correspondence (correspondence relationship) between a combination of ports in the topology information before update and a combination of ports in the topology information after update based on the topology information before update and the topology information after update.

FIG. 8 is a view showing an example of the correspondence information (correspondence relationship information). The generation section 15 combines the port number of the second communication apparatus 22 serving as the apparatus to be replaced and the port number of the apparatus to be connected in the topology information before update. For example, the generation section 15 generates a first apparatus to be replaced pair by combining the port number "B-1" of the second communication apparatus 22 serving as the apparatus to be replaced and the port number "A-6" of the first communication apparatus 21. The generation section 15 generates a second apparatus to be replaced pair by combining the port number "B-2" of the second communication apparatus 22 serving as the apparatus to be replaced and the port number "A-7" of the first communication apparatus 21. The generation section 15 generates a third apparatus to be replaced pair by combining the port number "B-6" of the second communication apparatus 22 serving as the apparatus to be replaced and the port number "C-1" of the first communication apparatus 21. The generation section 15 generates a fourth apparatus to be replaced pair by combining the port number "B-7" of the second communication apparatus 22 serving as the apparatus to be replaced and the port number "C-2" of the first communication apparatus 21. The generation section 15 associates each combination (the apparatus to be replaced pair) with a number (pair number) in a predetermined order.

The generation section 15 combines the port number of the fourth communication apparatus 24 serving as the replacing apparatus and the port number of the apparatus to be connected. For example, the generation section 15 generates a first replacing apparatus pair by combining the port number "D-4" of the fourth communication apparatus 24 serving as the replacing apparatus and the port number "A-9" of the first communication apparatus 21. The generation section 15 generates a second replacing apparatus pair by combining the port number "D-5" of the fourth communication apparatus 24 serving as the replacing apparatus and the port number "A-10" of the fourth communication apparatus 24 serving as the replacing apparatus. The generation section 15 generates a third replacing apparatus pair by combining the port number "D-7" of the fourth communication apparatus 24 serving as the replacing apparatus and the port number "C-3" of the first communication apparatus 21. The generation section 15 generates a fourth replacing apparatus pair by combining the port number "D-8" of the fourth communication apparatus 24 serving as the replacing apparatus and the port number "C-4" of the first communication apparatus 21. The generation section 15 associates each combination (the replacing apparatus pair) with a number (pair number) in a predetermined order.

In FIG. 3, the number of cables used to connect the second communication apparatus 22 serving as the apparatus to be replaced and the apparatus to be connected is equal to the number of cables used to connect the fourth communication apparatus 24 serving as the replacing apparatus and the apparatus to be connected. Consequently, the number of elements of the apparatus to be replaced pair is equal to the number of elements of the replacing apparatus pair for each apparatus to be connected.

FIG. 9 is a view showing an example of apparatus information after update (after connection of the replacing apparatus) "DB-c2". In the apparatus information after update, when compared with the apparatus information before update, data on the fourth communication apparatus 24 serving as the replacing apparatus is added. The link-up of the port of the first communication apparatus 21 connected to the fourth communication apparatus 24 serving as the replacing apparatus is activated. The link-up of the port of the third communication apparatus 23 connected to the fourth communication apparatus 24 serving as the replacing apparatus is activated. Information of each port of which the link-up is activated is added to the apparatus information.

The apparatus information acquisition section 13 detects the apparatus information of the fourth communication apparatus 24 serving as the replacing apparatus by using, e.g., Simple Network Management Protocol (SNMP) or the like. The apparatus information acquisition section 13 registers the apparatus information of the fourth communication apparatus 24 serving as the replacing apparatus in the apparatus information during update.

The generation section 15 generates the apparatus information after update "DB-c2" based on the apparatus information before update "DB-c1" and the correspondence information shown in FIG. 8. That is, the generation section 15 changes the apparatus information during update (after connection of the replacing apparatus) to the apparatus information after update "DB-c2" based on the correspondence information.

For the same pair number, the generation section 15 obtains the setting information of the port of the replacing apparatus pair by taking over the setting information of the port of the apparatus to be replaced pair. That is, for the same pair number, the setting information of the port of the apparatus to be replaced pair is determined to be the setting information of the port of the replacing apparatus pair by the generation section 15. For example, for the pair number "1", the generation section 15 uses the setting information of the port number "A-6" in the apparatus information during update as the setting information of the port number "A-9" in the apparatus information after update. That is, the generation section 15 obtains the setting information of the port number "A-9" in the apparatus information after update by taking over the setting information of the port number "A-6". Similarly, the generation section 15 obtains the setting information of the port number "D-4" in the apparatus information after update by taking over the setting information of the port number "B-1".

Thus, the generation section 15 generates the apparatus information after update (routing setting information of the replacing apparatus pair) based on the routing setting information of the apparatuses to be connected (the first communication apparatus 21 and the third communication apparatus 23) in the apparatus information during update, and the correspondence information. The same applies to the pair numbers "2", "3", and "4".

The setting section 16 sets the setting information of the replacing communication apparatus in the apparatus information after update in the fourth communication apparatus 24 serving as the replacing apparatus. That is, the setting section 16 reflects the setting information of the replacing communication apparatus in the apparatus information after update in the setting information of the fourth communication apparatus 24 serving as the replacing apparatus. The setting section 16 may transmit any of commands of Secure Shell (SSH), "Telnet", and "Open Flow" of SDN (Software-defined networking) or the like to the communication apparatus. The setting section 16 may use a setting tool (configuration management tool) such as Ansible for the communication apparatus.

The setting section 16 determines whether or not the update of the setting information of the apparatus to be connected is necessary. That is, the setting section 16 determines whether or not the setting information of the apparatus to be connected is updated. For example, in the case where the port setting or the routing information of the setting information of the apparatus to be connected is updated in the apparatus information after update, the setting section 16 determines that the setting information of the apparatus to be connected is updated.

In the case where it is determined that the setting information of the apparatus to be connected is updated, the setting section 16 sets the setting information of the apparatus to be connected in the apparatus information after update in the apparatus to be connected. For example, the setting section 16 updates the setting information of the first communication apparatus 21. The setting section 16 updates the setting information of the third communication apparatus 23.

Figure 10:
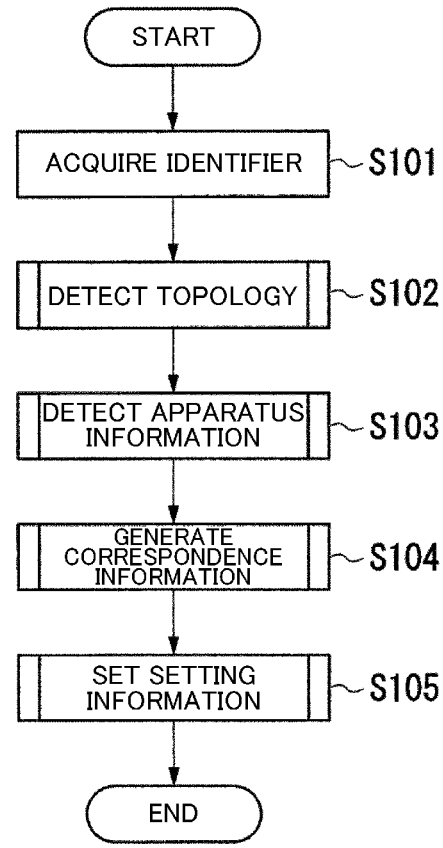
FIG. 10 is a flowchart showing an example of the operation procedure of the replacement management apparatus in the first embodiment.

Next, an example of the operation procedure of the replacement management apparatus 1 will be described. FIG. 10 is a flowchart showing an example of the operation procedure of the replacement management apparatus 1. The connection of cables is completed by the operator. The topology detection section 11 acquires the identifier of the second communication apparatus 22 serving as the apparatus to be replaced and the identifier of the fourth communication apparatus 24 serving as the replacing apparatus from the manager or the operator (Step S101). The topology detection section 11 executes identification processing of the communication apparatus in the communication apparatus group 2. The topology detection section 11 detects the topology of the network of the communication apparatus group 2 based on the detection result of the identifier of the communication apparatus (Step S102).

The apparatus information acquisition section 13 detects the apparatus information of each communication apparatus in the communication apparatus group 2 (Step S103). The generation section 15 generates the correspondence information based on the topology information before update and the topology information after update (Step S104). The setting section 16 sets the setting information of the replacing communication apparatus in the fourth communication apparatus 24 serving as the replacing apparatus. The setting section 16 sets the setting information of the apparatus to be connected in the apparatus to be connected (Step S105).

Figure 11:
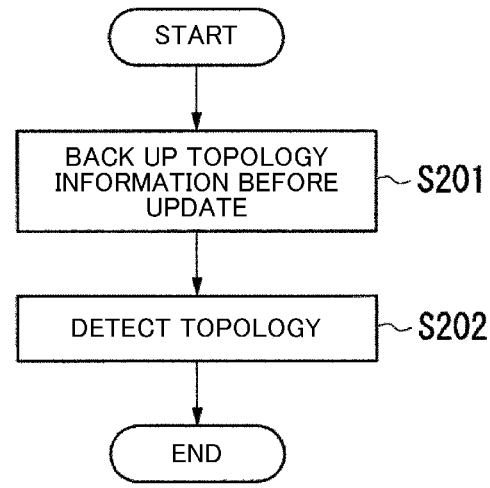
FIG. 11 is a flowchart showing an example of the operation procedure of a topology detection section in the first embodiment.

FIG. 11 is a flowchart showing an example of the operation procedure of the topology detection section 11 or the like. The flowchart shown in FIG. 11 shows the detail of Step S102 shown in FIG. 10. The generation section 15 or the topology detection section 11 backs up the topology information before update. The generation section 15 or the topology detection section 11 records the topology information before update in, e.g., the memory 101 (Step S201).

The topology detection section 11 detects the topology of the network of the communication apparatus group 2. For example, the topology detection section 11 transmits an LLDP (Link Layer Discovery Protocol) packet to each communication apparatus. The topology detection section 11 acquires a response signal from each communication apparatus. With this, the topology detection section 11 can collect the port number and the like of the apparatus to be connected (Step S202).

Figure 12:
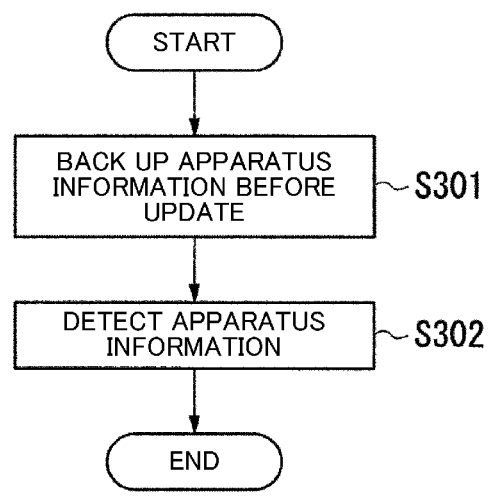
FIG. 12 is a flowchart showing an example of the operation procedure of an apparatus information acquisition section in the first embodiment.

FIG. 12 is a flowchart showing an example of the operation procedure of the apparatus information acquisition section 13. The flowchart shown in FIG. 12 shows the detail of Step S105 shown in FIG. 10. The apparatus information acquisition section 13 backs up the apparatus information before update. The apparatus information acquisition section 13 records the apparatus information before update in, e.g., the memory 101 (Step S301). The apparatus information acquisition section 13 detects the apparatus information of each communication apparatus in the communication apparatus group 2. The apparatus information acquisition section 13 updates the apparatus information based on the detection result (Step S302).

Figure 13:
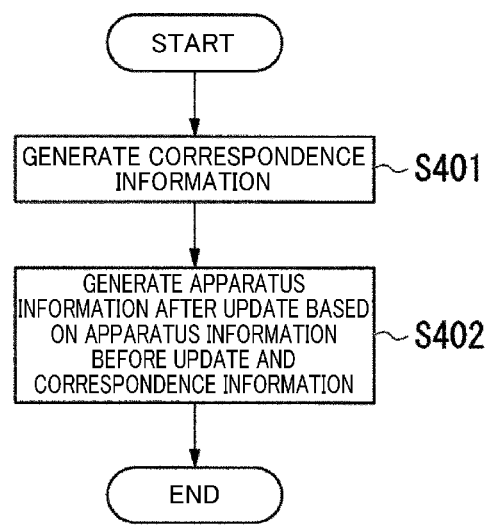
FIG. 13 is a flowchart showing an example of the operation procedure of a generation section in the first embodiment.

FIG. 13 is a flowchart showing an example of the operation procedure of the generation section 15. The generation section 15 generates the correspondence information based on the topology information before update and the topology information after update (Step S401). The generation section 15 generates the apparatus information after update based on the apparatus information before update and the correspondence information (Step S402).

Figure 14:
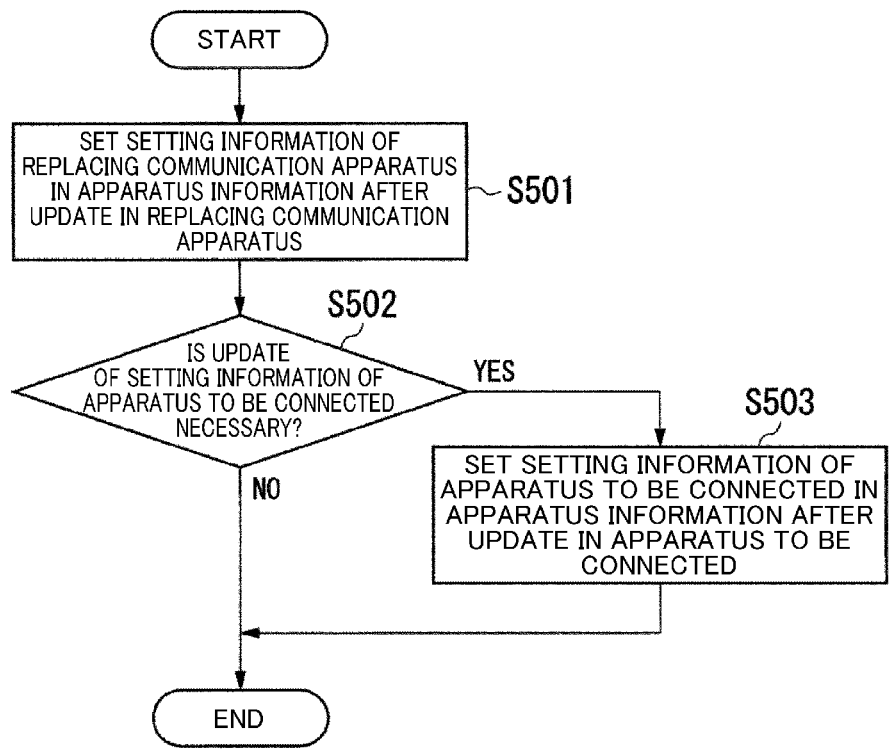
FIG. 14 is a flowchart showing an example of the operation procedure of a setting section in the first embodiment.

FIG. 14 is a flowchart showing an example of the operation procedure of the setting section 16. The setting section 16 sets the setting information of the replacing communication apparatus in the apparatus information after update in the fourth communication apparatus 24 serving as the replacing apparatus (Step S501). The setting section 16 determines whether or not the update of the setting information of the apparatus to be connected is necessary (Step S502). In the case where the update of the setting information of the apparatus to be connected is necessary (Step S502: YES), the setting section 16 sets the setting information of the apparatus to be connected in the apparatus information after update in the apparatus to be connected (Step S503). In the case where the update of the setting information of the apparatus to be connected is not necessary (Step S502: NO), the setting section 16 ends processing shown as an example in FIG. 14.

Thus, the replacement management apparatus 1 in the first embodiment includes the apparatus information acquisition section 13 (detection section) and the generation section 15. The replacement management apparatus 1 may further include the setting section 16. The apparatus information acquisition section 13 detects a first communication speed (e.g., 10 Gbps) and first setting information (the setting information before update) of the physical port used for the connection for each of the communication apparatus to be replaced (e.g., the second communication apparatus 22) and the communication apparatus to be connected. The apparatus information acquisition section 13 detects a second communication speed (e.g., 10 Gbps) of the physical port used for the connection for the replacing communication apparatus (e.g., the fourth communication apparatus 24). The generation section 15 generates second setting information (the setting information after update) of the physical port used for the connection for each of the replacing communication apparatus and the communication apparatus to be connected based on the detected first communication speed, second communication speed, and first setting information. The setting section 16 sets the operation of the physical port based on the second setting information for each of the replacing communication apparatus and the communication apparatus to be connected.

With this, it is possible to generate the setting information of the replacing communication apparatus and the setting information of the communication apparatus to be connected. It is possible to implement prevention of a mistake in wiring work by the operator at the site and automation of setting work by the remote operator.

Note that the replacement management apparatus 1 may detect, for each apparatus to be connected, the communication speed of the physical port used for the connection for each of the communication apparatus to be replaced and the replacing communication apparatus. The replacement management apparatus 1 may derive, for each apparatus to be connected, the communication capacity (the sum total of the communication speeds of the individual ports) for each of the communication apparatus to be replaced and the replacing communication apparatus. For example, in the case where the communication capacity of the replacing communication apparatus is not less than the communication capacity of the communication apparatus to be replaced for every apparatus to be connected, the replacement management apparatus 1 may determine that the communication apparatus to be replaced can be replaced by the replacing communication apparatus.

Second Embodiment

A second embodiment is different from the first embodiment in that the second communication apparatus 22 before failure (in the state in which communication can be performed) is replaced by the fourth communication apparatus 24. In the second embodiment, points different from the first embodiment will be described.

Figure 15:
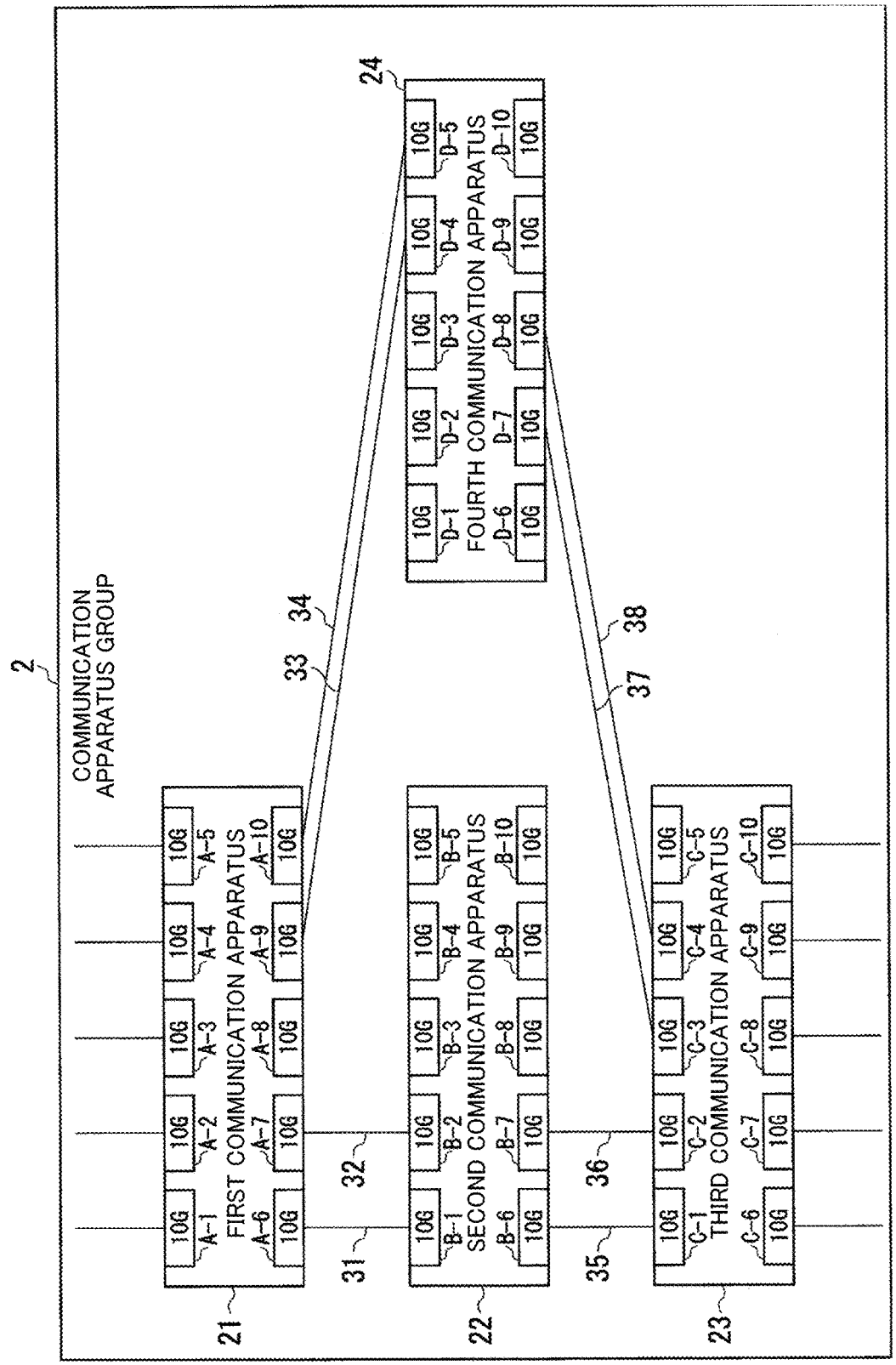
FIG. 15 is a view showing an example of replacement of a communication apparatus in a second embodiment.

FIG. 15 is a view showing an example of the replacement of the communication apparatus. The second communication apparatus 22 before failure (in the state in which communication can be performed) is replaced by the fourth communication apparatus 24.

In FIG. 15, cables of which the number is equal to the number of cables 31 and 32 which are connected from the first communication apparatus 21 serving as the apparatus to be connected to the second communication apparatus 22 are newly provided. A cable 33 and a cable 34 are newly provided cables. The first communication apparatus 21 serving as the apparatus to be connected and the fourth communication apparatus 24 are connected to each other by using the cable 33 and the cable 34.

Similarly, cables of which the number is equal to the number of cables 35 and 36 which are connected from the third communication apparatus 23 serving as the apparatus to be connected to the second communication apparatus 22 are newly provided. A cable 37 and a cable 38 are newly provided cables. The third communication apparatus 23 serving as the apparatus to be connected and the fourth communication apparatus 24 are connected to each other by using the cable 37 and the cable 38.

The generation section 15 may generate the apparatus information after update by deleting data on the second communication apparatus 22 serving as the apparatus to be replaced from the apparatus information before update at the timing when setting processing of the setting information by the setting section 16 is ended.

Thus, similarly to the first embodiment, the replacement management apparatus 1 generates the setting information of the replacing communication apparatus and the setting information of the communication apparatus to be connected. The replacement management apparatus 1 sets the generated setting information in the replacing communication apparatus and sets the generated setting information in the communication apparatus to be connected.

With this, in the case where the communication speed of the port in the communication apparatus to be replaced is equal to the communication speed of the port in the replacing communication apparatus, it is possible to generate the setting information of the replacing communication apparatus and the setting information of the communication apparatus to be connected.

Third Embodiment

A third embodiment is different from the first embodiment in that the communication capacity of the second communication apparatus 22 serving as the apparatus to be replaced is different from the communication capacity of the fourth communication apparatus 24 serving as the replacing apparatus. In the third embodiment, points different from the first embodiment will be described.

FIG. 16 is a view showing an example of the replacement of the communication apparatus. The second communication apparatus 22 after failure is replaced by the fourth communication apparatus 24. Traffic of communication is consolidated to the fourth communication apparatus 24. In FIG. 16, for example, cables 31, 32, and 33 are consolidated to cables 41 and 42. Cables 35, 36, and 40 are consolidated to cables 43 and 44.

In FIG. 16, the communication capacity of the second communication apparatus 22 is lower than the communication capacity of the fourth communication apparatus 24. The communication speed of each port of the second communication apparatus 22 is, e.g., 10 Gbps. The communication speed of each port of the fourth communication apparatus 24 is, e.g., 25 Gbps.

The first communication apparatus 21 includes a plurality of ports having different communication speeds. The communication speed of the port of the first communication apparatus 21 is, e.g., 10 Gbps or 25 Gbps. The third communication apparatus 23 includes a plurality of ports having different communication speeds. The communication speed of the port of the third communication apparatus 23 is, e.g., 10 Gbps or 25 Gbps. The port having the communication speed of 10 Gbps is connected to the port of the second communication apparatus 22. The port having the communication speed of 25 Gbps is connected to the port of the fourth communication apparatus 24.

In FIG. 16, the cable 41 and the cable 42 are newly provided such that the communication capacity of the fourth communication apparatus 24 serving as the replacing apparatus is not less than the communication capacity in the cables 31, 32, and 39. The cable 43 and the cable 44 are newly provided such that the communication capacity of the fourth communication apparatus 24 serving as the replacing apparatus is not less than the communication capacity in the cables 35, 36 and 40.

In the third embodiment, from the viewpoint of consolidation of communication, VLAN setting is not necessary and the routing setting is necessary in the fourth communication apparatus 24. The fourth communication apparatus 24 is, e.g., an L3 switch or a router.

FIG. 17 is a view showing an example of the topology information before update (before connection of the replacing apparatus) "DB-t1". In FIG. 17, for example, the port numbers "B-1", "B-2", and "B-3" of the second communication apparatus 22 serving as the apparatus to be replaced are associated with "A-6", "A-7", and "A-8" of the first communication apparatus 21 serving as the apparatus to be connected.

FIG. 18 is a view showing an example of the topology information after update (after connection of the replacing apparatus) "DB-t2". In FIG. 18, for example, the port numbers "D-1" and "D-2" of the fourth communication apparatus 24 serving as the replacing apparatus are associated with "A-9" and "A-10" of the first communication apparatus 21 serving as the apparatus to be connected.

FIG. 19 is a view showing an example of the correspondence information. In the topology information before update, the generation section 15 combines the port number of the second communication apparatus 22 serving as the apparatus to be replaced and the port number of the apparatus to be connected. For example, the generation section 15 combines the port number "B-1" of the second communication apparatus 22 serving as the apparatus to be replaced and the port number "A-6" of the first communication apparatus 21. The generation section 15 combines the port number "B-2" of the second communication apparatus 22 serving as the apparatus to be replaced and the port number "A-7" of the first communication apparatus 21. The generation section 15 combines the port number "B-3" of the second communication apparatus 22 serving as the apparatus to be replaced and the port number "A-8" of the first communication apparatus 21.

The generation section 15 combines the port number "B-6" of the second communication apparatus 22 serving as the apparatus to be replaced and the port number "C-1" of the first communication apparatus 21. The generation section 15 combines the port number "B-7" of the second communication apparatus 22 serving as the apparatus to be replaced and the port number "C-2" of the first communication apparatus 21. The generation section 15 combines the port number "B-8" of the second communication apparatus 22 serving as the apparatus to be replaced and the port number "C-3" of the first communication apparatus 21. The generation section 15 associates combinations (apparatus to be replaced pairs) with numbers (pair numbers) in a predetermined order.

In FIG. 19, the number of cables used to connect the second communication apparatus 22 serving as the apparatus to be replaced and the apparatus to be connected is different from the number of cables used to connect the fourth communication apparatus 24 serving as the replacing apparatus and the apparatus to be connected. Consequently, the number of elements of the apparatus to be replaced pair is different from the number of elements of the replacing apparatus pair.

The generation section 15 generates the apparatus information after update "DB-c2" based on the apparatus information before update "DB-c1" and the correspondence information. That is, the generation section 15 changes the apparatus information during update (after connection of the replacing apparatus) to the apparatus information after update "DB-c2" based on the correspondence information.

FIG. 20 is a view showing an example of the apparatus information before update (before connection of the replacing apparatus) "DB-c1". In FIG. 20, in the setting information of the second communication apparatus 22 serving as the apparatus to be replaced, gateways (port numbers) "B-1", "B-2", and "B-3" are registered.

FIG. 21 is a view showing an example of the apparatus information during update (after connection of the replacing apparatus). The apparatus information acquisition section 13 updates the apparatus information based on the detection result. The generation section 15 generates the apparatus information after update "DB-c2" based on the apparatus information before update "DB-c1" and the correspondence information shown in FIG. 19. That is, the generation section 15 changes the apparatus information during update (after connection of the replacing apparatus) to the apparatus information after update "DB-c2" based on the correspondence information.

In the case where communication is consolidated or distributed, the generation section 15 assigns the port selected from the replacing apparatus pair for each pair number to the setting information of the port of the replacing apparatus pair. In this case, the generation section 15 may assign the port uniformly selected from the replacing apparatus pair for each pair number to the setting information of the port of the replacing apparatus pair. For example, the generation section 15 assigns the port number "D-1" or "D-2" selected from the port numbers of the replacing apparatus pair in a round-robin manner to the setting information (routing setting) of the port of the replacing apparatus pair.

FIG. 22 is a view showing an example of the apparatus information after update (after connection of the replacing apparatus). The generation section 15 assigns the port number selected from the port numbers of the replacing apparatus pair in the round-robin manner and an address corresponding to the selected port number to the setting information (routing setting) of the port of the replacing apparatus pair.

For example, for the pair number "1" in the correspondence information, the generation section 15 alternately registers the port number "D-1" or "D-2" associated with the port number "B-1", "B-2", or "B-3" included in the routing information of the second communication apparatus 22 serving as the apparatus to be replaced in the apparatus information before update shown in FIG. 20 in the routing information of the fourth communication apparatus 24 serving as the replacing apparatus in the apparatus information after update.

For example, for the pair number "2" in the correspondence information, the generation section 15 alternately registers the port number "D-6" or "D-7" associated with the port numbers "B-6", "B-7", and "B-8" included in the routing information of the second communication apparatus 22 serving as the apparatus to be replaced in the apparatus information before update shown in FIG. 20 in the routing information of the fourth communication apparatus 24 serving as the replacing apparatus in the apparatus information after update.

Note that the generation section 15 may convert the routing information of the pair number "1" and the routing information of the pair number "2" to the routing information including the port number of the fourth communication apparatus 24 serving as the replacing apparatus at the same time.

Thus, the generation section 15 in the third embodiment determines whether or not the number of cables connected from the communication apparatus to be connected to the communication apparatus to be replaced is different from the number of cables connected from the communication apparatus to be connected to the replacing communication apparatus. In the case where it is determined that the numbers of cables are different from each other, the generation section 15 registers the physical port selected from a plurality of the physical ports (e.g., "D-1" and "D-2") used to connect the replacing communication apparatus (e.g., the fourth communication apparatus 24) and the communication apparatus to be connected (e.g., the first communication apparatus 21) in the round-robin manner in the second setting information (the setting information after update), as shown as an example in FIG. 22.

With this, even in the case where the communication speed of the port in the communication apparatus to be replaced is lower than the communication speed of the port in the replacing communication apparatus, it is possible to generate the setting information of the replacing communication apparatus and the setting information of the communication apparatus to be connected.

Fourth Embodiment

A fourth embodiment is different from the third embodiment in that the second communication apparatus 22 before failure is replaced by the fourth communication apparatus 24. In the fourth embodiment, points different from the third embodiment will be described.

Figure 23:
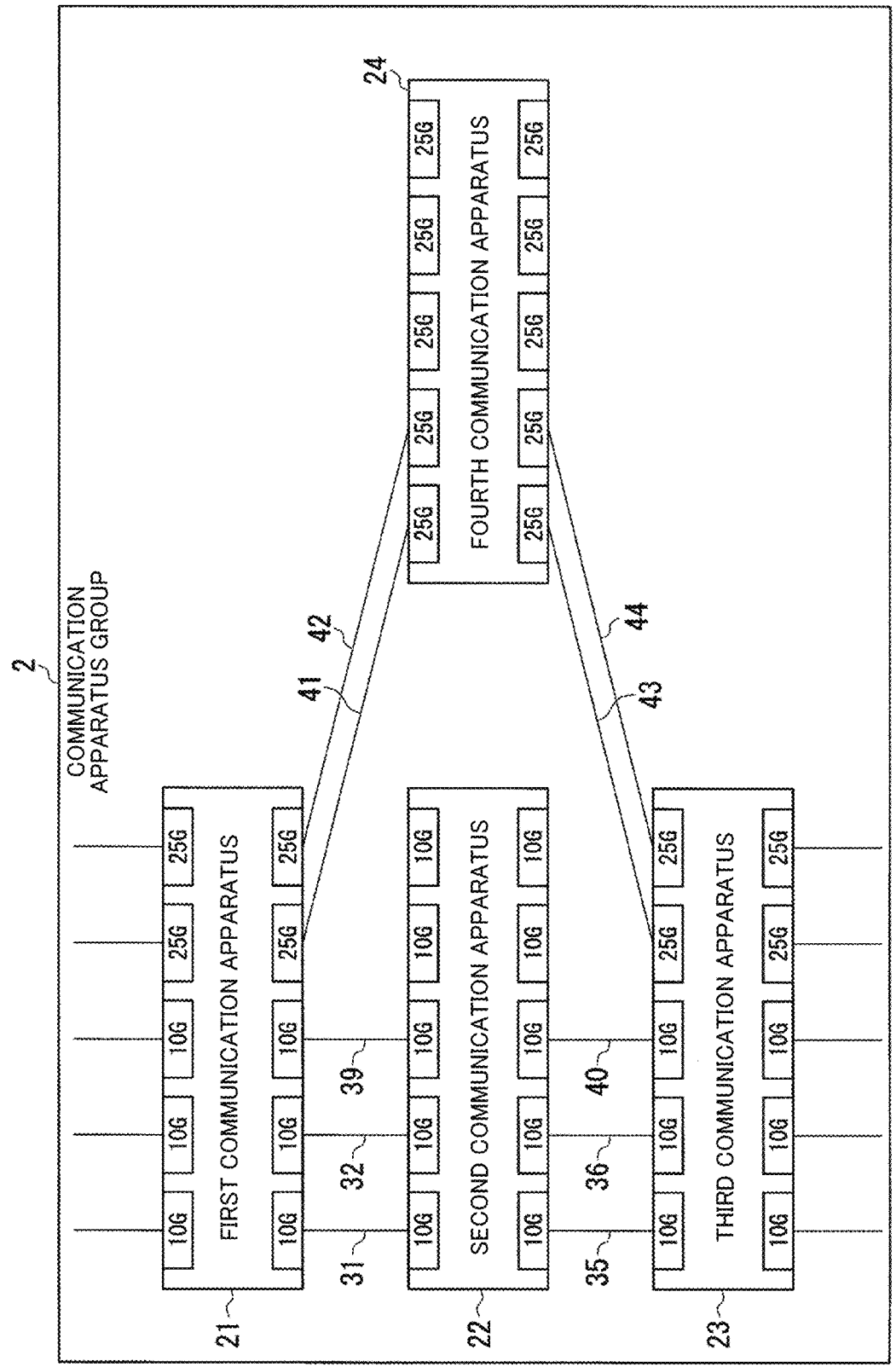
FIG. 23 is a view showing an example of replacement of a communication apparatus in a fourth embodiment.

FIG. 23 is a view showing an example of the replacement of the communication apparatus. The second communication apparatus 22 before failure is replaced by the fourth communication apparatus 24. Traffic of communication is consolidated to the fourth communication apparatus 24.

Thus, similarly to the third embodiment, the replacement management apparatus 1 generates the setting information of the replacing communication apparatus and the setting information of the communication apparatus to be connected. The replacement management apparatus 1 sets the generated setting information in the replacing communication apparatus and sets the generated setting information in the communication apparatus to be connected.

With this, even in the case where the communication speed of the port in the communication apparatus to be replaced is lower than the communication speed of the port in the replacing communication apparatus, it is possible to generate the setting information of the replacing communication apparatus and the setting information of the communication apparatus to be connected.

Fifth Embodiment

A fifth embodiment is different from the third embodiment in that the communication speed of each port in the fourth communication apparatus 24 serving as the replacing apparatus is lower than the communication speed of each port in the second communication apparatus 22 serving as the apparatus to be replaced. In the fifth embodiment, points different from the third embodiment will be described.

Figure 24:
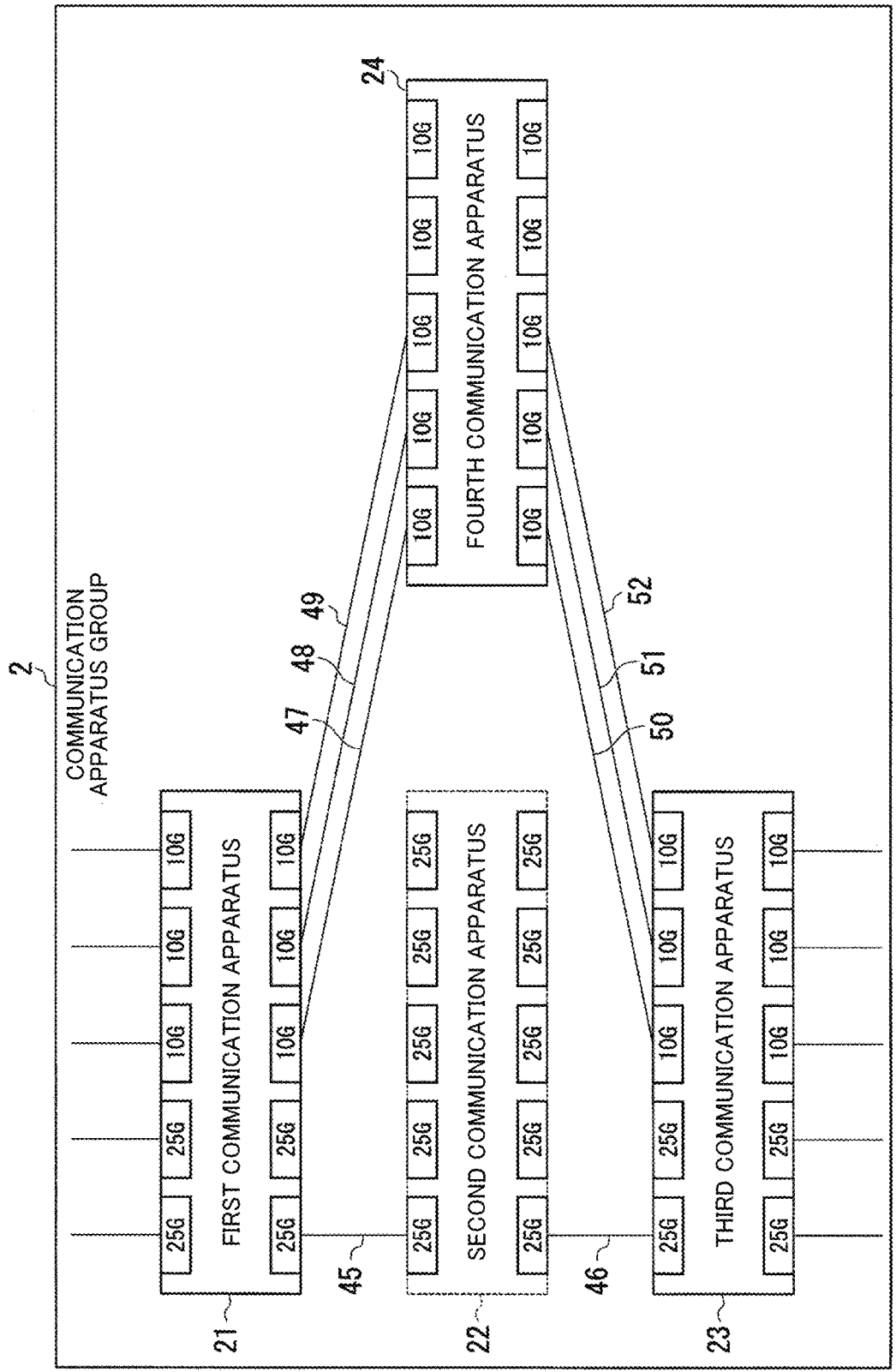
FIG. 24 is a view showing an example of replacement of a communication apparatus in a fifth embodiment.

FIG. 24 is a view showing an example of the replacement of the communication apparatus. The second communication apparatus 22 after failure is replaced by the fourth communication apparatus 24. Traffic of communication is distributed to the fourth communication apparatus 24.

In FIG. 24, the communication capacity of the second communication apparatus 22 is higher than the communication capacity of the fourth communication apparatus 24. The communication speed of each port of the second communication apparatus 22 is, e.g., 25 Gbps. The communication speed of each port of the fourth communication apparatus 24 is, e.g., 10 Gbps.

In FIG. 24, cables 47, 48, and 49 are cables which are newly provided such that the communication capacity of the fourth communication apparatus 24 serving as the replacing apparatus is not less than the communication capacity in a cable 45. Cables 50, 51, and 52 are cables which are newly provided such that the communication capacity of the fourth communication apparatus 24 serving as the replacing apparatus is not less than the communication capacity in a cable 46.

Thus, similarly to the third embodiment, the replacement management apparatus 1 generates the setting information of the replacing communication apparatus and the setting information of the communication apparatus to be connected. The replacement management apparatus 1 sets the generated setting information in the replacing communication apparatus and sets the generated setting information in the communication apparatus to be connected.

With this, even in the case where the communication speed of the port in the communication apparatus to be replaced is higher than the communication speed of the port in the replacing communication apparatus, it is possible to generate the setting information of the replacing communication apparatus and the setting information of the communication apparatus to be connected.

Sixth Embodiment

A sixth embodiment is different from the fifth embodiment in that the second communication apparatus 22 before failure (in the state in which communication can be performed) is replaced by the fourth communication apparatus 24. In the sixth embodiment, points different from the fifth embodiment will be described.

Figure 25:
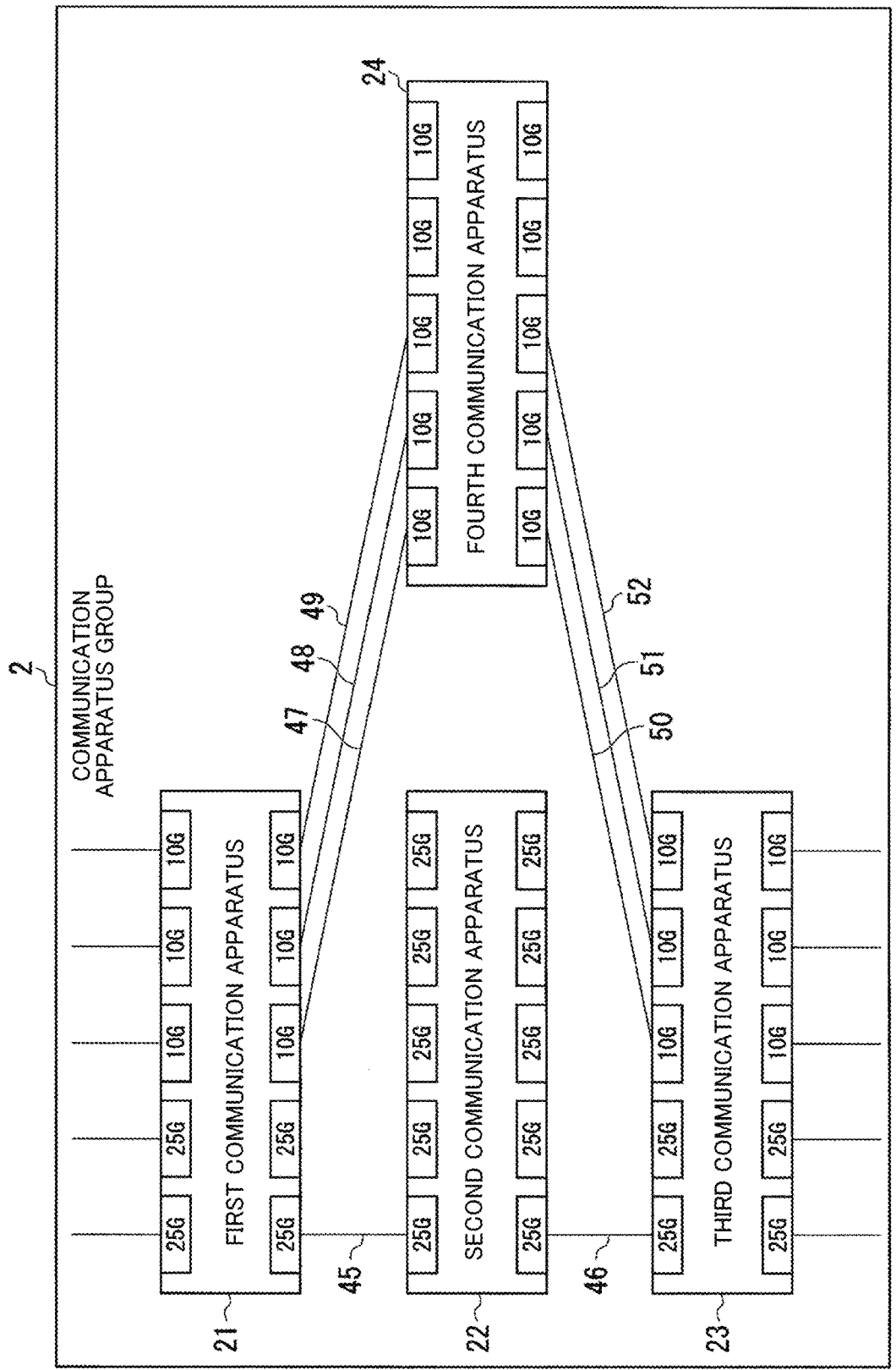
FIG. 25 is a view showing an example of replacement of a communication apparatus in a sixth embodiment.

FIG. 25 is a view showing an example of the replacement of the communication apparatus. The second communication apparatus 22 before failure is replaced by the fourth communication apparatus 24. Traffic of communication is distributed to the fourth communication apparatus 24.

Thus, similarly to the third embodiment, the replacement management apparatus 1 generates the setting information of the replacing communication apparatus and the setting information of the communication apparatus to be connected. The replacement management apparatus 1 sets the generated setting information in the replacing communication apparatus and sets the generated setting information in the communication apparatus to be connected.

With this, even in the case where the communication speed of the port in the communication apparatus to be replaced is higher than the communication speed of the port in the replacing communication apparatus, it is possible to generate the setting information of the replacing communication apparatus and the setting information of the communication apparatus to be connected.

While the embodiments of the invention have been described in detail with reference to the drawings, the specific configuration is not limited to the embodiments, and design or the like without departing from the gist of the invention is also included.

INDUSTRIAL APPLICABILITY

The present invention can be applied to the replacement management apparatus which manages the replacement of the communication apparatus.

REFERENCE SIGNS LIST

1 Replacement management apparatus
2 Communication apparatus group
11 Topology detection section
12 Topology storage section
13 Apparatus information acquisition section
14 Apparatus information storage section
15 Generation section
16 Setting section
21 First communication apparatus
22 Second communication apparatus
23 Third communication apparatus
24 Fourth communication apparatus
31 to 52 Cable
100 Processor
101 Memory
102 Storage apparatus
103 Display section
104 Communication section
A, B, C, D Port

The invention claimed is:

1. A replacement management apparatus comprising:
a processor; and
a storage medium having computer program instructions stored thereon, when executed by the processor, perform to:
detect a first communication speed and first setting information of a physical port used for connection for each of a communication apparatus to be replaced and a communication apparatus to be connected, and detects a second communication speed of a physical port used for connection for a replacing communication apparatus,
wherein the first setting information includes a port setting and a routing setting,
wherein the port setting includes an indicator of whether or not the network is a virtual local area network, and the routing setting includes a port number of a gateway and an IP address of a destination; and
generate second setting information of the physical port used for connection for each of the replacing communication apparatus and the communication apparatus to be connected based on the detected first communication speed, the detected second communication speed, and the detected first setting information.

2. The replacement management apparatus according to claim 1, wherein the computer program instructions further perform to
set an operation of the physical port based on the second setting information for each of the replacing communication apparatus and the communication apparatus to be connected.

3. The replacement management apparatus according to claim 1, wherein the computer program instructions further perform to
generate correspondence information serving as information representing a correspondence between a combination of the physical ports which connect the communication apparatus to be replaced and the communication apparatus to be connected and a combination of the physical ports which connect the replacing communication apparatus and the communication apparatus to be connected, and generate the second setting information based on the first setting information and the correspondence information.

4. The replacement management apparatus according to claim 3, wherein
in a case where a number of cables connected from the communication apparatus to be connected to the communication apparatus to be replaced is different from the number of cables connected from the communication apparatus to be connected to the replacing communication apparatus, the computer program instructions further perform to register a physical port selected from a plurality of the physical ports which connect the replacing communication apparatus and the communication apparatus to be connected in a round-robin manner in the second setting information.

5. A replacement management method executed by a replacement management apparatus which manages replacement of a communication apparatus, the replacement management method comprising:

a detection step of detecting a first communication speed and first setting information of a physical port used for connection for each of a communication apparatus to be replaced and a communication apparatus to be connected, and detecting a second communication speed of a physical port used for connection for a replacing communication apparatus, wherein the first setting information includes a port setting and a routing setting, wherein the port setting includes an indicator of whether or not the network is a virtual local area network, and the routing setting includes a port number of a gateway and an IP address of a destination; and a generation step of generating second setting information of the physical port used for connection for each of the replacing communication apparatus and the communication apparatus to be connected based on the detected first communication speed, the detected second communication speed, and the detected first setting information.

6. The replacement management method according to claim 5, further comprising:

setting an operation of the physical port based on the second setting information for each of the replacing communication apparatus and the communication apparatus to be connected.

7. The replacement management method according to claim 5, further comprising:

generating correspondence information serving as information representing a correspondence between a combination of the physical ports which connect the communication apparatus to be replaced and the communication apparatus to be connected and a combination of the physical ports which connect the replacing communication apparatus and the communication apparatus to be connected, and generating the second setting information based on the first setting information and the correspondence information.

8. The replacement management method according to claim 7, wherein in a case where a number of cables connected from the communication apparatus to be connected to the communication apparatus to be replaced is different from the number of cables connected from the communication apparatus to be connected to the replacing communication apparatus, the method further includes registering a physical port selected from a plurality of the physical ports which connect the replacing communication apparatus and the communication apparatus to be connected in a round-robin manner in the second setting information.

9. A replacement management apparatus comprising:

a processor; and a storage medium having computer program instructions stored thereon, when executed by the processor, perform to:

detect a first communication speed and first setting information of a physical port used for connection for each of a communication apparatus to be replaced and a communication apparatus to be connected, and detects a second communication speed of a physical port used for connection for a replacing communication apparatus; and generate second setting information of the physical port used for connection for each of the replacing communication apparatus and the communication apparatus to be connected based on the detected first communication speed, the detected second communication speed, and the detected first setting information, wherein the computer program instructions further perform to:

generate correspondence information serving as information representing a correspondence between a combination of the physical ports which connect the communication apparatus to be replaced and the communication apparatus to be connected and a combination of the physical ports which connect the replacing communication apparatus and the communication apparatus to be connected, and generate the second setting information based on the first setting information and the correspondence information, wherein in a case where a number of cables connected from the communication apparatus to be connected to the communication apparatus to be replaced is different from the number of cables connected from the communication apparatus to be connected to the replacing communication apparatus, the computer program instructions further perform to register a physical port selected from a plurality of the physical ports which connect the replacing communication apparatus and the communication apparatus to be connected in a round-robin manner in the second setting information.

* * * * *